Figure 1:
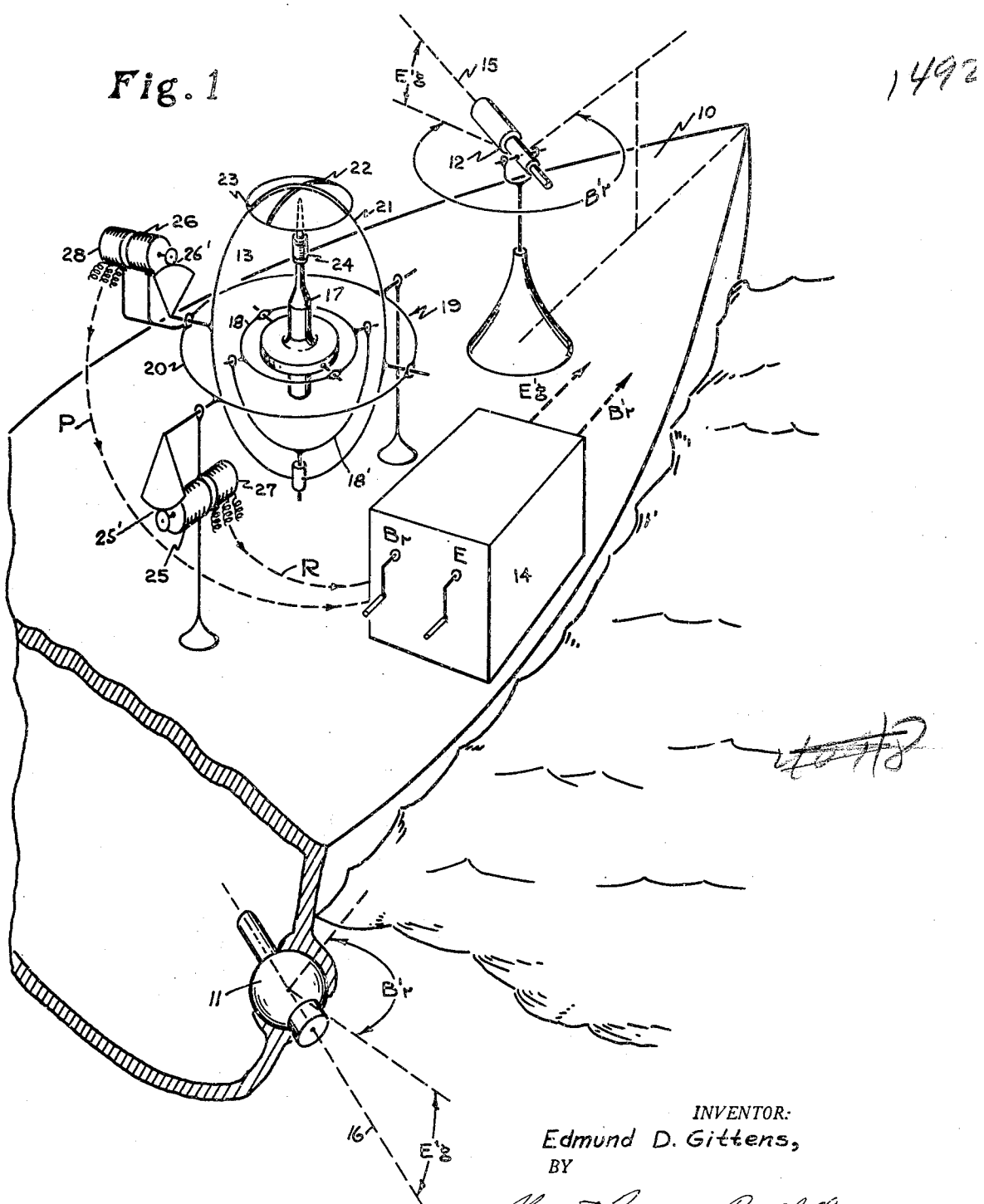

Nov. 1, 1949

E. D. GITTENS
ANGLE CALCULATING APPARATUS FOR
USE WITH UNSTABLE PLATFORMS 2,486,781

Filed June 21, 1945

2 Sheets—Sheet 1

INVENTOR:
Edmund D. Gittens,
BY
ATTORNEYS

INVENTOR.
Edmund D. Gittens,

Patented Nov. 1, 1949

2,486,781

UNITED STATES PATENT OFFICE 2,486,781

ANGLE CALCULATING APPARATUS FOR USE WITH UNSTABLE PLATFORMS

Edmund D. Gittens, Roselle, N. J., assignor to Arma Corporation, Brooklyn, N. Y., a corporation of New York Application June 21, 1945, Serial No. 600,778

10 Claims. (Cl. 33—46)

This invention relates to calculating apparatus for determining angles, and has particular reference to means for transforming angular coordinates in three dimensions for use on unstable platforms, for correcting instruments mounted thereon.

Calculating apparatus mounted on unstable platforms, such as ships, aircraft and the like, and adapted to determine the position of a remote subject, require continuous calculation of the changing relations involved between the apparatus and the remote subject, such as a target. For example, calculating apparatus utilizing a telescope mounted on a ship by means of train and elevation axes requires correction in train or elevation, or both, when the ship rolls or pitches. Likewise, a pivoted echo scanning or aural listening device, whether above or below the water surface, requires similar correction in order to remain on the target or other remote subject.

Heretofore, such necessary corrections were introduced by means of a device for continuously indicating the true vertical and usually consisting of an universally suspended gyroscope and a power follow-up system for continuously measuring and transmitting the roll and pitch, or level and cross-level angles, to the observation instrument. If the angle-measuring mechanism is fixed to the deck, the angles measured are usually roll and pitch, but if the angle-measuring mechanism also has a train axis, the angles measured are level and cross-level. The majority of the angle-measuring mechanisms in use have a train axis, and are more complicated for that reason, whereas those without a train axis have been used only to a limited extent because of their inaccuracy. The stabilizing mechanism utilized with the calculating apparatus of the present invention is of the type having no train axis and provides roll and pitch angles for use in a computing system for continuously and accurately calculating deck train and deck elevation angles for a given direction in the horizontal plane and elevation in the vertical plane.

In accordance with the present invention, an electrical angle calculating apparatus is provided which continuously receives roll and pitch angles from the stabilizing mechanism and observed or otherwise determined bearing and elevation angles, and inductively resolves those four values into trigonometric functions of train angle and elevation angle above the ship's deck. Six separate but cooperating induction resolvers, receiving the four input movements and giving out the two output movements, are utilized in a simple arrangement to continuously produce accurate and instantaneous values corresponding to the continually changing conditions of operation on an unstable platform.

Figure 2:
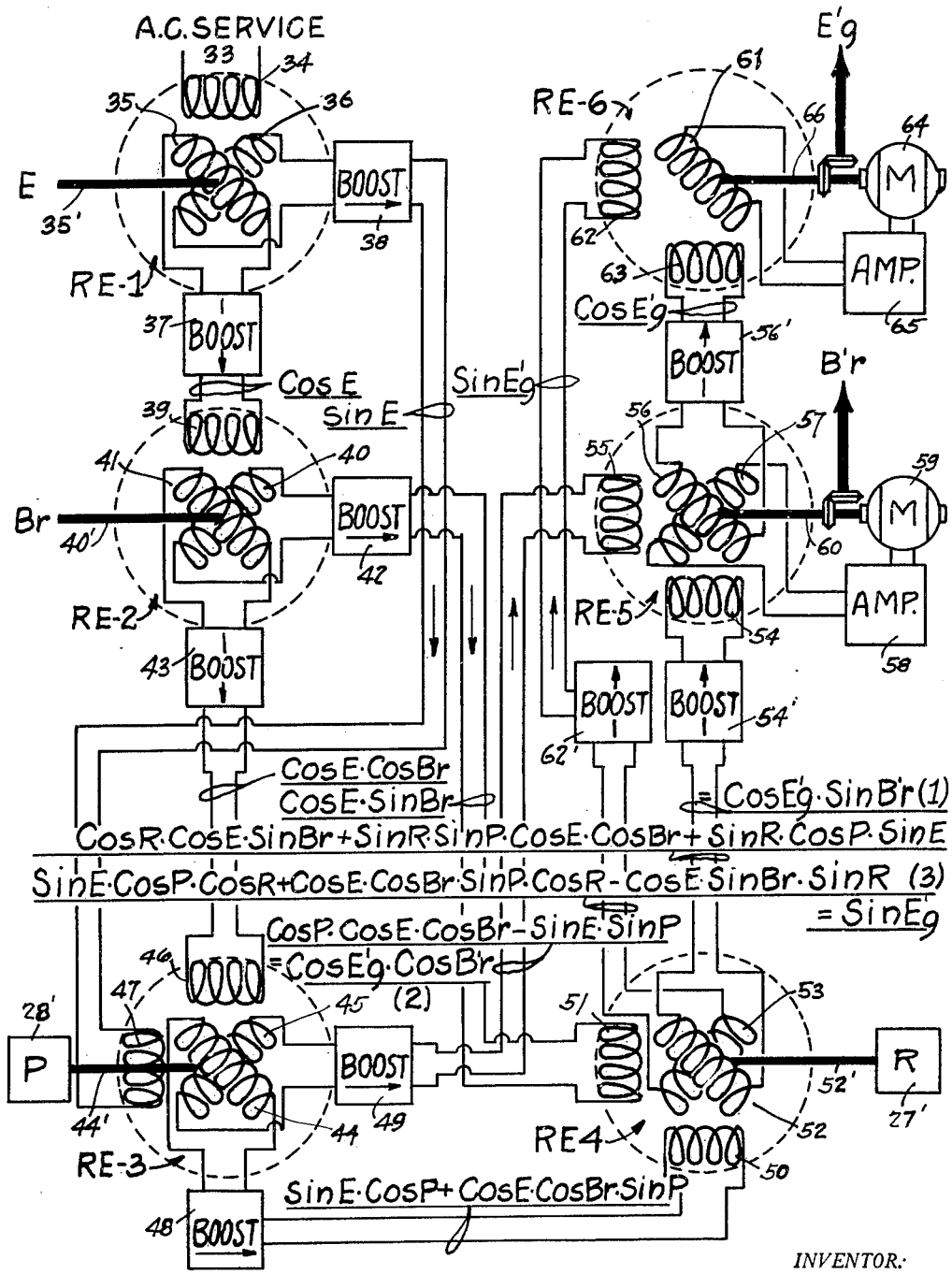

For a more complete understanding of the invention, reference may be had to the accompanying drawings, in which:

Figure 1 is a schematic perspective view of a portion of a ship hull fitted with a stable element, an observation instrument, an underwater signalling device, and a calculator for the angle inputs from the stable element; and Fig. 2 is a schematic wiring diagram of the calculator shown in Fig. 1.

Referring to Fig. 1, numeral 10 designates a ship, broken away amidships and showing an underwater signalling device 11 pivoted in the hull. The observation instrument 12 is depicted as a simple telescope commonly pivoted on the deck on the fore-and-aft axis along with the universally-suspended gyroscopic stable element 13 for continuously measuring roll and pitch angles of the ship, which are fed as electrical quantities to the calculator 14 of this invention, to be described in detail. The values concerned in this calculator are as follows:

$E$=target elevation: the elevation of the director line of sight above the horizontal, measured in a vertical plane through the present line of sight.

$Br$=relative target bearing: the angle between the vertical plane through the fore-and-aft axis of own ship, and the vertical plane through the line of sight, measured in the horizontal plane clockwise from the bow of the ship.

$R$=roll angle: the angle about a fore-and-aft axis in the deck, measured in the athwartship plane perpendicular to the deck, between its intersection with the horizontal plane and with the deck plane.

$P$=pitch angle: the angle measured about an axis in the horizontal plane, the angle, between the horizontal plane and the deck plane, measured in the vertical plane through the fore-and-aft axis of own ship.

$B'r$=train angle: the angle between the vertical plane through the fore-and-aft axis of own ship, and the vertical plane through the line of sight, measured in the deck plane, clockwise from the bow of the ship.

$E'g$=elevation angle above the deck: the angle about an axis parallel to the deck, measured in the plane perpendicular to the deck containing the line of sight between the line of sight and a plane through that axis parallel to the deck.

It is well known that the angle B'r, between the line of sight or direction of the telescope 12 or the signalling unit 11 from the bow of the ship, measured in the plane of the deck, changes virtually continually due to the unstable condition of the ship or other vehicle upon which these devices are mounted, such as roll, pitch, change of course, and the like, assuming that it is desired to keep the lines 15 and 16 fixed in space as on a remote subject, such as a target. Similarly, the angle E'g between the horizontal and the respective lines of sight or directions 15 and 16 of devices 12 and 11, respectively, changes with the roll and pitch of the ship. These changing angles B'r and E'g are continuously calculated by the calculator 14 when the desired location of the line in space, 15 or 16, or both, is supplied thereto in reference to the plane of the sea by the angles Br and E, and the roll R and pitch P are continuously fed into the calculator 14 by the stable element 13 indicated in Fig. 1.

The construction and operation of the stable element 13 is generally well-known and it includes a vertical gyroscope universally supported in a power-driven gimbal system 19 including gimbal ring 18 pivoted on bail 18' journalled about a vertical axis on vertical frame 21 pivoted athwartships on horizontal ring 20, in turn pivoted on the deck about an axis coincident with the fore-and-aft vertical plane. Mounted on pitch gimbal frame 21 is a double induction coil 22 whose axis lies in a fore-and-aft direction and which detects ship's roll. A similar double induction coil 23 is mounted on pitch gimbal frame 21, but with its axis arranged athwartships for detecting ship's pitch.

The follow-up coils 22 and 23 cooperate with an electromagnet 24 mounted coaxially with the spin axis of the gyroscope 17 and arranged to induce currents in coils 22 or 23 when displaced from the center or vertical position with respect thereto. Thus, follow-up coil 22 analyzes relative movement of the electromagnet 24 during roll of the ship 10 and the currents induced therein are amplified and fed to follow-up motor 25 which, through gear segment 25' connected to roll gimbal 20, returns the latter to horizontal position. Similarly, pitch follow-up coil 23 analyzes pitch of the ship 10 and the currents induced therein during its movement relatively to coil 24 are amplified and fed to pitch follow-up motor 26 which, through gear sector 26' mounted on the axis of pitch gimbal frame 21 returns the latter to vertical position.

Transmitter 27 driven by roll follow-up motor 25, supplies electrical quantities proportional to roll angle R to the calculator 14 whereas transmitter 28 driven by pitch follow-up motor 26 transmits electrical quantities proportional to pitch angle P to calculator 14, as indicated in Fig. 1. The mathematical formulae employed in the calculator 14 are based on spherical trigonometry and are $$\cos E'g \cdot \sin B'r = \cos R \cdot \cos E \cdot \sin Br + \sin R \cdot \sin P \cdot \cos E \cdot \cos Br + \sin R \cdot \cos P \cdot \sin E \quad (1)$$
$$\cos E'g \cdot \cos B'r = \cos P \cdot \cos E \cdot \cos Br - \sin E \cdot \sin P \quad (2)$$
$$\sin E'g = \sin E \cdot \cos P \cdot \cos R + \cos E \cdot \cos Br \cdot \sin P \cdot \cos R - \cos E \cdot \sin Br \cdot \sin R \quad (3)$$

Since the angles B'r and E'g are the quantities to be calculated it is evident that they must be acceptable in the form given to the left of the equal sign in the Formulas 1, 2 and 3, and then solution made of these terms to secure the angles.

It is therefore necessary to calculate continuously the formulae to the right of the equal sign in the three formulae and this is done in calculator 14, shown in schematic detail in Fig. 2.

Referring to Fig. 2 of the drawings, roll angle R and pitch angle P, supplied by corresponding receivers 27' and 28', and desired position angles E and Br, supplied from handcranks so designated in Figs. 1, or automatically by means not shown, are continuously introduced into calculator 14, which calculates and gives out the correct bearing angle B'r and the correct deck elevation angle E'g. These two output values, determined from the aforementioned four input values are supplied for use in laying guns or other apparatus or instruments whose direction or other operation is based upon the direction, for example, of a remote object or subject, such as a target.

The aforementioned four input values are fed into and the aforementioned two output values are fed out of electrical trigonometric resolvers or calculators operated inductively and designated respectively RE1 to RE6, in Fig. 2. In each of these instruments, one or more coils rotates relatively to one or more stationary coils, and when either one or more stationary coils or one or more rotating coils is energized, a voltage is induced in the other whose magnitude depends jointly upon the angular relation between them and the input voltage or voltages. The voltage or the movement resulting from mutual induction corresponds to a trigonometric function of the angle and the input voltage or voltages.

Since, by inspection of the above formulae it is seen that every term contains either the sine or the cosine of the angle E, the first step is to create both these values. This is done in resolver RE1. Referring to RE1 of Fig. 2, the stationary coil 34 is energized from a source 33 of alternating current of fixed frequency. The rotor comprises two coils 35 and 36 in space quadrature rotated by a shaft 35' positioned in accordance with the elevation angle E. Stator coil 34 produces an alternating current flux which induces in rotor coils 35 and 36 corresponding voltages which are trigonometric functions of the elevation angle E.

The foregoing describes the essential component parts of an electromechanical induction resolver, which when used as trigonometric function computer, has at least one stator coil energized in accordance with the radius or linear voltage representing one side of a right triangle and its rotor turned through an angle representing one acute angle of the right triangle, so that the field established by the energized stator coil induces in the rotor coils voltages proportional to the sine and cosine functions of the stator angle.

In a typical operation of resolver RE1, and assuming that rotor coil 35 is adapted to give a voltage proportional to the cosine of the angle E, and that rotor coil 36 is adapted to give a voltage proportional to the sine of angle E, a voltage corresponding to cosine E is fed to a conventional electronic booster 37 and a voltage corresponding to the sine E is fed to a conventional electronic booster 38. Booster 37 and 38 are preferably of a suitable 100% reversed feed-back type or any other suitable unit giving out amplified electric current strictly proportional to the demand voltages supplied thereto. One form of such booster which is suitable for this purpose is disclosed in copending application Serial No.

530,589, filed April 12, 1944, by Frederick W. Cunningham, Patent 2,429,124 granted Oct. 14, 1947.

The amplified voltage corresponding to cosine E is impressed upon the stator coil 39 of electrical resolver RE2 whose rotor coils 40 and 41 in space quadrature are positioned by shaft 40' according to the input angle $Br$. Accordingly, in resolver RE2 the desired train angle of devices 11 and 12 enters into the calculation of the cosine of the elevation angle E, by introducing the sine of the angle $Br$ by means of the voltage induced in rotor coil 40, which is fed to booster 42. Similarly the cosine of the angle $Br$ appears on rotor coil 41 as a corresponding induced voltage and is fed to booster 43.

Electrical resolver RE3 comprises two stator coils 46 and 47 energized respectively with the voltages corresponding to cosine E cosine $Br$ from booster 43 and sine E from booster 38. The rotor coils 44 and 45 of electrical resolver RE3, mounted in space quadrature on shaft 44', are positioned in accordance with the pitch angle P and induce corresponding voltages. Thus, rotor coil 44 produces a voltage equal to the compound mathematical quantity which contains cosine P multiplied by the voltage on stator coil 47 plus sine P multiplied by the voltage of stator coil 46, or $\sin E \cdot \cos P + \cos E \cdot \cos Br \cdot \sin P$. Similarly, rotor coil 45 produces a voltage equal to the compound mathematical quantity which also contains the sine and cosine values of the angle P. The summation of two quantities in the output voltage of rotor coil 44, and the difference between two quantities in the output voltage of rotor coil 45 is due to the fact that the output voltage of a rotor coil in resolver RE-3 is always equal to the algebraic sum of the voltages induced in the rotor coil by both stator coils. In view of the fixed displacement of 90° between the magnetic axes of the two rotor coils, i. e., the coils are in quadrature relation to each other, the angular displacement of one rotor coil is 90° plus the angular displacement of the rotor of the resolver from its zero position, so that, from trigonometry, the sine of 90° plus the angle in the first quadrant is equal to the cosine of the angle, whereas the cosine of 90° plus the angle is the negative sine of the angle. Thus, the output of the rotor coil 45 is the right hand quantity of the Formula 2 and in view of the equation it may be considered to be equal to $\cos E'g \cdot \cos B'r$ as indicated. In this way pitching of the ship 10 enters into calculations.

Electrical resolver RE4 is similar to resolver RE3 in that it has two stator coils 50 and 51, the former receiving the voltage induced in rotor coil 44 of resolver RE3 after amplification thereof in booster 48 and the latter receiving the amplified voltage induced in rotor coil 40 of resolver RE2 from booster 42. The rotor coils 52 and 53 of resolver RE4 are mounted in space quadrature on shaft 52' adjusted in accordance with roll of the ship in the manner described, whereby quantities impressed on stator coils 50 and 51 are modified by both the sine and cosine of the roll angle R, the voltage induced in rotor coil 52 being fed through booster 54' to stator coil 54 of resolver RE5 and the voltage induced in winding 53 of RE4 being fed through booster 62' to stator coil 62 of resolver RE6. Thus, the voltage output of rotor coil 52, viz., $\cos R \cdot \cos E \cdot \sin Br + \sin R \cdot \sin P \cdot \cos E \cdot \cos Br + \sin R \cdot \cos P \cdot \sin E$, is equivalent to $\cos E'g \cdot \sin B'r$ according to Formula 1. Also, the voltage output of rotor coil 53, viz. $\sin E \cdot \cos P \cdot \cos R + \cos E \cdot \cos Br \cdot \sin P \cdot \cos R - \cos E \cdot \sin Br \cdot \sin R$, is equivalent to $\sin E'g$ according to Formula 3.

Electrical resolvers RE5 and RE6 are output resolvers and operate differently than the input resolvers Re1 to RE4 in that they do not receive angular values but provide them, RE5 providing an angular value corresponding to the desired train angle $B'r$ and resolver RE6 providing the corrected elevation angle $E'g$.

Resolver RE5 solves the angle $B'r$, and supplies the output voltage $\cos E'g$ which represent the acute angle and hypotenuse, respectively, of a right triangle, whereas the input quantities of resolver RE5 represent the remaining sides of the triangle and form the right angle thereof. Thus the input $\cos E'g \cos B'r$ voltage is applied to stator coil 55, while the other input, $\cos E'g \sin B'r$ voltage, is applied to stator coil 54. The output voltage of rotor null coil 57 of resolver RE5 is the algebraic sum of the voltages induced in the null coil by the stator coils 54 and 55, and may be expressed as $$(\cos E'g \sin B'r) \sin (90°+\theta) + (\cos E'g \cos B'r) \cos (90°+\theta)$$

where $\theta$ is the angular displacement of the rotor of resolver RE5 from its zero position. The output voltage of null coil 57 is applied to the input of a conventional electronic amplifier 58, and the output voltage of the amplifier is applied to motor 59. Motor 59 drives the rotor of resolver RE5 to the angular position where the algebraic sum of the voltages induced in null coil 57 is zero, i. e., $$(\cos E'g \sin B'r) \sin (90°+\theta) + (\cos E'g \cos B'r) \cos (90°+\theta) = 0 \quad (a)$$

From trigonometry;

$$\sin (90°+\theta) = \cos \theta$$
$$\cos (90°+\theta) = -\sin \theta$$

Therefore Equation $a$ may be rewritten as, $$(\cos E'g \sin B'r) \cos \theta - (\cos E'g \cos B'r) \sin \theta = 0 \quad (b)$$

Dividing by $\cos \theta$, $$(\cos E'g \sin B'r) - (\cos E'g \cos B'r) \tan \theta = 0 \quad (c)$$

Simplifying Equation $c$, $$\tan \theta = \left(\frac{\cos E'g \sin B'r}{\cos E'g \cos B'r}\right) = \frac{\sin B'r}{\cos B'r} = \tan B'r \quad (d)$$

Therefore, if $\tan \theta = \tan B'r$, it follows that, $$\theta = B'r$$

The above analysis indicates that resolver RE5 continuously solves the angle $B'r$ from input voltages proportional respectively to ($\cos E'g \sin B'r$) and ($\cos E'g \cos B'r$).

When angle $B'r$ is solved by resolver RE5, the output voltage of rotor coil 56 is proportional to $\cos E'g$. This may be shown mathematically as follows:

The output voltage of rotor coil 56 is the algebraic sum of the voltages induced in the rotor coil by stator coils 54 and 55, and may be expressed as, $$(\cos E'g \sin B'r) \sin B'r + (\cos E'g \cos B'r) \cos B'r \quad (e)$$

Simplifying Expression $e$, $$\cos E'g (\sin^2 B'r + \cos^2 B'r) = \cos E'g$$

Thus, when null coil 57 is not positioned at the correct B'r angular position, current will be supplied to the motor 59 to cause it to turn shaft 60 until a voltage is no longer induced in null coil 57, i. e. when the angle B'r is achieved, and hence motor 59 is deenergized. However, because the roll and pitch values vary, especially during a rough sea, the angle B'r will be changing in accordance with its variations determined by the instantaneous conditions of roll or pitch, or both, so that angle B'r on shaft 60 is usually changing continuously and is supplied in that form as the value B'r from shaft 60 to instruments 11 or 12 or other apparatus required to be stabilized or corrected in accordance with the train value of B'r.

Resolver RE6 operates like resolver RE5 and solves the angle E'g from input quantities of sin E'g and cos E'g, which respectively represent the side of a right triangle opposite angle E'g, and the base of the triangle cooperating with the hypotenuse, equal to unity, to form the angle E'g. The rotor coil 61 is a null coil similar to null coil 57 of resolver RE5 and motor 64 is energized by voltage induced in null coil 61 amplified at 65 by reason of disagreement between the position of null coil 61 and the angle E'g. As described in connection with motor 59, the motor 64 rotates shaft 66 of rotor 61 until the latter is positioned in accordance with the angle E'g, whereupon the motor 64 is deenergized. However, especially in a rough sea, angle E'g varies almost continuously so that motor 64 remains energized as it continuously follows the changing angle of E'g, and may be used for setting instruments 11 and 12 and other apparatus required to be adjusted in elevation.

Amplifier 65 is shown as one form of well known type of electronic power amplifier that has been found suitable and amplifier 58 may be the same. Similarly, boosters 42, 43, 48, 49, 54', 62' and 56' are preferably of the construction and function described in connection with boosters 37 and 38.

It will be understood that, whereas the solution as above described proceeds logically from one end of the chain of resolvers to the other, that is from inputs to outputs, the actual calculator 14 does not act so, but all action is coordinated and almost instantaneous, so that the output angles are smoothly and continuously changing as the ship rolls and pitches. It will also be understood that whereas electrical resolvers have been shown in every instance and their use is preferred for many reasons, mechanical equivalents could be used throughout or in part and good results could be obtained. Other changes in form and detail lie within the scope of the invention as defined by the appended claims.

I claim:

1. In calculating apparatus for transforming the coordinates of the angular position of a line in space relative to the horizontal and vertical into coordinates relatively to an unstable surface, the combination of a plurality of mechanisms for determining the trigonometric functions of angle and linear inputs, a stable element, movable means responsive to relative movements between said element and surface in mutually perpendicular planes, means movable in accordance with the elevation angle of said line in the vertical plane, means movable in accordance with the bearing of said line in a horizontal plane, operative connections between each of said means and one of said mechanisms for adjusting the latter in accordance with the corresponding angle, electrical means on each of said mechanisms responsive to said adjustment for developing a corresponding electrical value, connections between successive mechanisms for supplying said corresponding electrical values as linear inputs from one to the other, and a pair of additional mechanisms actuated in accordance with outputs of said first-named mechanisms for determining angular values respectively equal to the elevation of said line in a plane perpendicular to said surface and the bearing of said line in a plane parallel to said surface.

2. In calculating apparatus for transforming the coordinates of the angular position of a line in space relative to the horizontal and vertical into coordinates relatively to an unstable surface, the combination of a plurality of electromechanical mechanisms for determining the trigonometric functions of angle and linear inputs, means responsive to angular movements of said surface relatively to a fixed plane, means movable in accordance with the elevation angle of said line in the vertical plane, means movable in accordance with the bearing of said line in a horizontal plane, operative connections between each of said means and one of said mechanisms for adjusting the latter in accordance with the corresponding angle, electrical induction means in each mechanism for inducing a voltage having a magnitude according with said angular input, connections between successive mechanisms for supplying said induced voltages as linear inputs from one to the other, and a pair of additional electromechanical mechanisms actuated in accordance with voltage outputs of said first-named mechanisms for determining angular values respectively equal to the elevation of said line in a plane perpendicular to said surface and the bearing of said line in a plane parallel to said surface.

3. In calculating apparatus for transforming the coordinates of the angular position of a line in space relative to the horizontal and vertical into coordinates relatively to an unstable surface, the combination of a plurality of mechanisms comprising inductively coupled stator and rotor windings for determining the trigonometric functions of angle and linear inputs, means responsive to angular movements of said surface relatively to a fixed plane, means movable in accordance with the elevation angle of said line in the vertical plane, means movable in accordance with the bearing of said line in a horizontal plane, operative connections between each of said means and the rotor of one of said mechanisms for adjusting the latter in accordance with the corresponding angle, connections between the rotor and the stator windings of successive mechanisms for supplying induced voltage linear inputs from one to the other, and a pair of additional mechanisms comprising inductively coupled stator and rotor windings actuated in accordance with the rotor voltage outputs of said first-named mechanisms for determining and indicating angular values respectively equal to the elevation of said line in a plane perpendicular to said surface and the bearing of said line in a plane parallel to said surface.

4. In a calculating apparatus for transforming the coordinates of the angular position of a line in space relative to the horizontal and vertical into coordinates relatively to an unstable surface, the combination of means responsive to angular movements of said surface in mutually perpendicular planes relatively to a fixed plane, means movable in accordance with the elevation of and bearing of said line, a plurality of mechanisms comprising inductively-coupled stator and rotor windings respectively arranged in space quadrature, a source of alternating current connected to a stator winding of one of said mechanisms for energizing the same, operative connections between said second means and the rotor of said one mechanism for angularly adjusting the same in accordance with the elevation of said line, connections between a rotor winding of said one mechanism and a stator winding of a second mechanism for energizing the same with the voltage induced in said rotor winding, operative connections between said second means and the rotor of said second mechanism for adjusting the same in accordance with the bearing of said line, connections between a rotor winding of said first and second mechanisms and stator windings of a third mechanism for energizing the same, and operative connections between the rotor of said third mechanism and said first means for adjusting the former in accordance with the angular movements of said surface in one of said mutually perpendicular planes for inducing in a rotor winding of said third mechanism a voltage equal to the product of trigonometric functions of elevation and bearing angles of said line in respective planes perpendicular and parallel to said surface.

5. In a calculating apparatus for transforming the coordinates of the angular position of a line in space relative to the horizontal and vertical into coordinates relatively to an unstable surface, the combination of means responsive to angular pitching movements of said surface, means movable in accordance with the elevation and bearing of said line, a plurality of mechanisms comprising inductively-coupled stator and rotor windings respectively connected in space quadrature, a source of alternating current connected to a stator winding of one of said mechanisms for energizing the same, operative connections between said second means and the rotor of said one mechanism for angularly adjusting the same in accordance with the elevation of said line, connections between a rotor winding of said one mechanism and a stator winding of a second mechanism for energizing the same with the voltage induced in said rotor winding, operative connections between said second means and the rotor of said second mechanism for adjusting the same in accordance with the bearing of said line, connections between a rotor winding of said first and second mechanisms and stator windings of a third mechanism for energizing the same, and operative connections between the rotor of said third mechanism and said first means for adjusting the former in accordance with the angular pitching movements of said surface for inducing in a rotor winding of said third mechanism a voltage equal to the product of trigonometric functions of elevation and bearing angles of said line in respective planes perpendicular and parallel to said surface.

6. In a calculating apparatus for transforming the coordinates of the angular position of a line in space relative to the horizontal and vertical into coordinates relatively to an unstable surface, the combination of means responsive to angular movements of said surface in mutually perpendicular planes relatively to a fixed plane, means movable in accordance with the elevation of and bearing of said line, a plurality of mechanisms comprising inductively-coupled stator and rotor windings respectively arranged in space quadrature, a source of alternating current connected to a stator winding of one of said mechanisms for energizing the same, operative connections between said second means and the rotor of said one mechanism for angularly adjusting the same in accordance with the elevation of said line, connections between a rotor winding of said one mechanism and a stator winding of a second mechanism for energizing the same with the voltage induced in said rotor winding, operative connections between said second means and the rotor of said second mechanism for adjusting the same in accordance with the bearing of said line, connections between a rotor winding of said first and second mechanisms and stator windings of a third mechanism for energizing the same, and operative connections between the rotor of said third mechanism and said first means for adjusting the former in accordance with the angular movements of said surface in one of said mutually perpendicular planes, several connections between a rotor winding of said second and third mechanisms and stator windings of a fourth mechanism for energizing the same, and operative connections between the rotor of said fourth mechanism and said first means for adjusting the former in accordance with the angular movements of said surface in the other of said mutually perpendicular planes for inducing in a rotor winding of said fourth mechanism a voltage equal to the product of trigonometric functions of elevation and bearing angles of said line in respective planes perpendicular and parallel to said surface.

7. In a calculating apparatus for transforming the coordinates of the angular position of a line in space relative to the horizontal and vertical into coordinates relatively to an unstable surface, the combination of means responsive to angular movements of said surface in mutually perpendicular planes relatively to a fixed plane, means adjustable in accordance with the elevation of and bearing of said line, a plurality of mechanisms comprising inductively-coupled stator and rotor windings respectively arranged in space quadrature, a source of alternating current connected to a stator winding of one of said mechanisms for energizing the same, operative connections between said second means and the rotor of said one mechanism for angularly adjusting the same in accordance with the elevation of said line, connections between a rotor winding of said one mechanism and a stator winding of a second mechanism for energizing the same with the voltage induced in said rotor winding, operation connections between said second means and the rotor of said second mechanism for adjusting the same in accordance with the bearing of said line, connections between a rotor winding of said first and second mechanisms and stator windings of a third mechanism for energizing the same, and operative connections between the rotor of said third mechanism and said first means for adjusting the former in accordance with the angular movements of said surface in one of said mutually perpendicular planes, connections between a rotor winding of said second and third mechanisms and stator windings of a fourth mechanism for energizing the same, and operative connections between the rotor of said fourth mechanism and said first means for adjusting the former in accordance with the angular movements of said surface in the other of said mutually perpendicular planes for inducing in the respective rotor windings separate voltages equal to the values $$\cos E'g \cdot \sin B'r \text{ and } \sin E'g$$

as defined in the annexed specification.

8. In a calculating apparatus for transforming the coordinates of the angular position of a line in space relative to the horizontal and vertical into coordinates relatively to an unstable surface, the combination of means responsive to angular movements of said surface in mutually perpendicular planes relatively to a fixed plane, means adjustable in accordance with the elevation of and bearing of said line, a plurality of mechanisms comprising inductively-coupled stator and rotor windings respectively arranged in space quadrature, a source of alternating current connected to a stator winding of one of said mechanisms for energizing the same, operative connections between said second means and the rotor of said one mechanism for angularly adjusting the same in accordance with the elevation of said line, connections between a rotor winding of said one mechanism and a stator winding of a second mechanism for energizing the same with the voltage induced in said rotor winding, operative connections between said second means and the rotor of said second mechanism for adjusting the same in accordance with the bearing of said line, connections between a rotor winding of said first and second mechanisms and stator windings of a third mechanism for energizing the same, operative connections between the rotor of said third mechanism and said first means for adjusting the former in accordance with the angular movements of said surface in one of said mutually perpendicular planes, connections between a rotor winding of said second and third mechanisms and stator windings of a fourth mechanism for energizing the same, operative connections between the rotor of said fourth mechanism and said first means for adjusting the former in accordance with the angular movements of said surface in the other of said mutually perpendicular planes, connections between a rotor winding of said third and fourth mechanisms and stator windings of a fifth mechanism for energizing the same, a motor energized by the voltage induced in a rotor winding of said fifth mechanism, and operative connections between the rotor of said fifth mechanism and said motor, whereby said motor rotates said last-named rotor winding through a deenergizing angle equal to the angular relation of said line relatively to a plane fixed with respect to said surface.

9. In a calculating apparatus for transforming the coordinates of the angular position of a line in space relative to the horizontal and vertical into coordinates relatively to an unstable surface, the combination of means responsive to angular movements of said surface in mutually perpendicular planes relatively to a fixed plane, means adjustable in accordance with the elevation of and bearing of said line, a plurality of mechanisms comprising inductively-coupled stator and rotor windings respectively arranged in space quadrature, a source of alternating current connected to a stator winding of one of said mechanisms for energizing the same, operative connections between said second means and the rotor of said one mechanism for angularly adjusting the same in accordance with the elevation of said line, connections between a rotor winding of said one mechanism and a stator winding of a second mechanism for energizing the same with the voltage induced in said rotor winding, operative connections between said second means and the rotor of said second mechanism for adjusting the same in accordance with the bearing of said line, connections between a rotor winding of said first and second mechanisms and stator windings of a third mechanism for energizing the same, operative connections between the rotor of said third mechanism and said first means for adjusting the former in accordance with the angular movements of said surface in one of said mutually perpendicular planes, connections between a rotor winding of said second and third mechanisms and stator windings of a fourth mechanism for energizing the same, operative connections between the rotor of said fourth mechanism and said first means for adjusting the former in accordance with the angular movements of said surface in the other of said mutually perpendicular planes, connections between a rotor winding of said third and fourth mechanisms and stator windings of a fifth mechanism for energizing the same, a motor energized by the voltage induced in a rotor winding of said fifth mechanism, operative connections between the rotor of said fifth mechanism and said motor, connections between a rotor winding of said fourth and fifth mechanisms and stator windings of a sixth mechanism, a second motor energized by the voltage induced in a rotor winding of said sixth mechanism, and operative connections between the rotor of said sixth mechanism and said second motor, whereby said second motor rotates said last-named rotor through a deenergizing angle equal to the angular relation of said line relatively to a plane fixed with respect to said surface.

10. In a calculating apparatus for transforming the coordinates of the angular position of a line in space relative to the horizontal and vertical into coordinates relatively to an unstable surface, the combination of means responsive to angular movements of said surface in mutually perpendicular planes relatively to a fixed plane, means adjustable in accordance with the elevation of and bearing of said line, a plurality of mechanisms comprising inductively-coupled stator and rotor windings respectively arranged in space quadrature, a source of alternating current connected to a stator winding of one of said mechanisms for energizing the same, operative connections between said second means and the rotor of said one mechanism for angularly adjusting the same in accordance with the elevation of said line, connections between a rotor winding of said one mechanism and a stator winding of a second mechanism for energizing the same with the voltage induced in said rotor winding, operative connections between said second means and the rotor of said second mechanism for adjusting the same in accordance with the bearing of said line, connections between a rotor winding of said first and second mechanisms and stator windings of a third mechanism for energizing the same, operative connections between the rotor of said third mechanism and said first means for adjusting the former in accordance with the angular movements of said surface in one of said mutually perpendicular planes, connections between a rotor winding of said second and third mechanisms and stator windings of a fourth mechanism for energizing the same, operative connections between the rotor of said fourth mechanism and said first means for adjusting the former in accordance with the angular movements of said surface in the other of said mutually perpendicular planes, connections between a rotor winding of said third and fourth mechanisms and stator windings of a fifth mechanism for energizing the same, a motor energized by the voltage induced in a rotor winding of said fifth mechanism, connections between a rotor winding of said fourth and fifth mechanisms and stator windings of a sixth mechanism, a second motor energized by the voltage induced in a rotor winding of said sixth mechanism, and operative connections between the rotors of said fifth and sixth mechanisms and the corresponding first and second motors, whereby the motors rotate the corresponding rotors through deenergizing angles equal to the angular relation of said line in mutually perpendicular planes, one of which lies parallel to said surface.

EDMUND D. GITTENS.

REFERENCES CITED

The following references are of record in the file of this patent:

UNITED STATES PATENTS

| Number | Name | Date |
| --- | --- | --- |
| 1,891,397 | Watson | Dec. 20, 1932 |
| 1,937,336 | Ford et al. | Nov. 28, 1933 |
| 2,080,186 | Raymond | May 11, 1937 |
| 2,311,848 | Luhrs | Feb. 23, 1943 |
| 2,385,952 | Svoboda | Oct. 2, 1945 |
| 2,403,152 | Roters | July 2, 1946 |
| 2,406,836 | Holden | Sept. 3, 1946 |
| 2,410,638 | Davis et al. | Nov. 5, 1946 |

Disclaimer 2,486,781.—*Edmund D. Gittens*, Roselle, N. J. ANGLE CALCULATING APPARATUS FOR USE WITH UNSTABLE PLATFORMS. Patent dated Nov. 1, 1949. Disclaimer filed Oct. 14, 1954, by the assignee, *American Bosch Arma Corporation*.

Hereby enters this disclaimer to claims 1 to 10, inclusive, of said patent.
[*Official Gazette November 16, 1954.*]